Patented Feb. 10, 1942

2,272,578

UNITED STATES PATENT OFFICE 2,272,578

HYDROGENATED BUTTER METHOD

Frederic H. Penn, Dallas, Tex.

No Drawing. Application June 20, 1941,
Serial No. 399,026

2 Claims. (Cl. 99—121)

My invention relates to improvements in the manufacture of creamery butter whereby the butter is stabilized to retard rancidity under normal atmospheric conditions, and to improve the storage and keeping qualities. This application is a continuation-in-part of my earlier application, Ser. No. 370,721, filed December 18, 1940.

Heretofore it has been necessary to keep butter under refrigeration in order to have butter in a marketable and edible condition, and in many instances salt is added to butter as a preservative. Salted butter, when kept in cold storage for a prolonged time, loses weight.

From the time the butter is churned until it is used, special care and equipment are required for the storage and distribution, and for this reason distribution and marketing costs are high. Furthermore, butter is subject to rancidity, unless kept at proper refrigeration temperature.

The making of butter is an old and ancient art and present methods in principle are essentially the same since the introduction of the churn.

Many attempts have been made to prepare creamery butter to improve the keeping and storage qualities and to retard rancidity under normal atmospheric temperatures. Isomerization, polymerization and alkalization methods have been employed, but without success. The principal methods now in use to preserve butter are pasteurization of the cream and adding salt to the butter.

Creamery butter contains about 80% to 85% butter fats, 12% to 15% water, curd, salt, and small amount of lactose, casein and albumin, in an emulsified form. The butter fats are a mixture of milk fats having melting points ranging from about 6.67° C. (44° F.) to about 65.36° C. (150° F.).

An object of this invention is to prepare butter in such a form that rancidity is retarded under normal atmospheric temperatures.

Another object of this invention is to prepare butter in a suitable plastic form whereby the consistency of the butter is substantially uniform at all normal atmospheric temperatures.

I have discovered that by hydrogenating dehydrated creamery butter, a higher melting point can be obtained and the keeping and storage qualities improved and rancidity retarded. This can be accomplished by hydrogenating dehydrated butter to a desired iodine value in the substantial absence of air and moisture. The iodine value can be controlled by the degree of temperature, pressure and time employed in hydrogenating dehydrated butter. By varying the temperature, pressure or hydrogenating time, melting points ranging from about 33° C. (91.4° F.) to about 40° C. (104° F.) or higher, can be obtained.

Hydrogenating is an old method for increasing the melting point of fatty glycerides, such as cotton seed oil, coconut oil, and the like, which are used for shortening or cooking purposes. For these purposes, the flavor of the hydrogenated oil is not of importance, because the hydrogenated oil is not used as such as a food product, but in combination with other food products. When hydrogenated oils are used for making oleomargarine, flavoring and coloring matter are added to overcome the bland and waxy taste of the hydrogenated fatty oils. Heretofore hydrogenating methods have not been successfully used for increasing the melting point of food products containing fatty glycerides, where the natural flavor of the food product must be retained. Creamery butter has been hydrogenated for academic purposes, but these disclosures are not suitable for obtaining edible butter for consumer use. To obtain hydrogenated butter having a natural flavor, it is necessary to hydrogenate the butter at temperatures heretofore thought to be impractical, that is, at about atmospheric temperatures.

To obtain hydrogenated creamery butter in edible form and retain the natural flavor, the hydrogenation of the butter must be controlled within limits to obtain iodine values not below eighteen (18), because at this point butter commences to have a waxy taste and loses its natural flavor, and becomes hard. Butter having an iodine value below eighteen (18) is not an edible product. To obtain butter that will not soften under ordinary climatic conditions, the iodine value should not be higher than about thirty (30).

The results obtained from my experiment indicate that hydrogenation temperatures above 60° C. (140° F.) affect the flavor of the butter, and for this reason the lower the hydrogenating temperature and the shorter the time, the better the flavor. The preferred hydrogenating temperature range is from about 35° C. (95° F.) to about 55° C. (131° F.).

Illustrative of one of the preferred methods of obtaining higher melting point butter having keeping qualities: fresh churned creamery butter is heated to about 60° C. (140° F.) and then centrifuged to remove the water, curd, albumen and other rancid-forming materials. 400 grams of this centrifuged butter and about 6 grams of dehydrated Raney active nickel catalyst are placed in a rocking hydrogenating bomb of about 750 ml. capacity, electrically heated. The bomb is closed and the air is eliminated by passing hydrogen through the bomb. After eliminating the air, the bomb is filled with hydrogen until a pressure of about 1,000 pounds is obtained. The dehydrated butter is hydrogenated at a temperature of about 40° C. (104° F.) and at a pressure of about 1,000 pounds for about sixty minutes. After removing the hydrogenated butter from the bomb, the catalyst is filtered out. The resultant hydrogenated dehydrated butter has an iodine value of 24.2 and a melting point of 38° C. (100.4° F.). The hydrogenated butter is kept at a temperature of about 40° C. (104° F.) and then 70 grams of water, at about the same temperature, is added and the mixture emulsified by stirring until the butter is in a plastic form. After allowing to set for about 24 hours, the butter is ready for use. The resultant hydrogenated butter is plastic at temperatures from about 30° C. (86° F.) to about 43° C. (109.4° F.). When water is emulsified into hydrogenated dehydrated butter, the softening point of the butter is increased from about 5° to about 10° F., above the softening point of the hydrogenated dehydrated butter. For this reason, it is possible to utilize hydrogenated butter having melting points otherwise too low for commercial use.

Hydrogenated dehydrated butter may be used in dehydrated form without the addition of water. However, the hydrogenated dehydrated butter should be stirred during the cooling of the butter to plastic consistency to avoid formation of coarse or granular particles.

By varying the temperature, pressure, and hydrogenation time, hydrogenated dehydrated butter having iodine values of about eighteen (18) to thirty (30) may be obtained, having different melting points and plastic properties.

In the preceding example the amount of water used is equivalent to about 15% of the butter, and is within the definition for government regulation butter standards. However, larger amounts of water may be used, whereby butter pastes are obtained, which may be used as a butter salad dressing, and the like.

This invention is not limited to any specific hydrogenation apparatus, as dehydrated butter may be hydrogenated in any suitable hydrogenating equipment whereby the necessary hydrogen pressure can be maintained with circulation or agitation of the butter, in the absence of air, at the required temperatures, in the presence of suitable active catalysts.

The terms "creamery butter" and "butter" as used herein are intended to mean butter made from pasteurized cow's cream.

Having described my invention, I claim:

1. A process for improving the storage and keeping qualities of butter which comprises dehydrating the butter and hydrogenating the dehydrated butter fat in the substantial absence of air and moisture at a temperature of from about 35° C. to about 60° C.

2. A process for improving the storage and keeping qualities of butter which comprises dehydrating the butter, hydrogenating the dehydrated butter fat in the substantial absence of air and moisture at a temperature of from about 35° C. to about 60° C., and emulsifying the hydrogenated product with water.

FREDERIC H. PENN.